United States Patent
Ito et al.

(10) Patent No.: US 7,479,996 B2
(45) Date of Patent: Jan. 20, 2009

(54) NOISE ELIMINATING DEVICE AND METHOD THEREFOR

(75) Inventors: Hiroshi Ito, Tokyo (JP); Koichi Magai, Tokyo (JP); Mitsuyoshi Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 690 days.

(21) Appl. No.: 11/217,356

(22) Filed: Sep. 2, 2005

(65) Prior Publication Data

US 2006/0232689 A1    Oct. 19, 2006

(30) Foreign Application Priority Data

Apr. 15, 2005 (JP) ............................. 2005-118298

(51) Int. Cl.
*H04N 5/217* (2006.01)
(52) U.S. Cl. ...................... 348/241; 382/275
(58) Field of Classification Search ......... 348/241–251; 358/463; 382/275
See application file for complete search history.

(56) References Cited

U.S. PATENT DOCUMENTS 5,715,000 A * 2/1998 Inamori ................... 348/241
6,801,255 B2 * 10/2004 Inui ....................... 348/241
6,940,547 B1 * 9/2005 Mine ...................... 348/241

OTHER PUBLICATIONS

D. Kirovski et al., "Replacement Attack on Arbitrary Watermarking Systems", Proc. ACM Workshop on DRM, Nov. 2002.

* cited by examiner

*Primary Examiner*—Lin Ye
*Assistant Examiner*—Amy Hsu
(74) *Attorney, Agent, or Firm*—Birch, Stewart, Kolasch & Birch, LLP

(57) ABSTRACT

To obtain a noise eliminating device which is capable of efficiently separating a noise component from an image component to attenuate only the noise component. A noise eliminating device includes: a first input reading unit (101) for reading out input image block data of a predetermined block; a second input reading unit (102) for reading out reference data containing data in the vicinities of the predetermined block; an output reading unit (104) for reading out output image block data of the predetermined block; a comparing unit (105) for comparing a level of a difference signal representing a difference between the input image block data and the output image block data with a predetermined value; a retrieving unit (106) for retrieving retrieval block data correlating with the input image block data; a switching unit (107) for outputting output image block update data based on comparison results; an output writing unit (111) for writing the scaled output image block update data to an output image buffer (103); and a control unit (112) for successively carrying out setting of a plurality of predetermined blocks.

4 Claims, 3 Drawing Sheets

```
01  V=0, N=Nmax
02  DO WHILE N>=Nmin
03    C=0
04    FOR j=1,K
05      FOR i=1,L
06        IF | Vi^{Nφ(j)} -Bi^{Nφ(j)} | /(N*N)>D
07        DO FIND Ri^{Nφ(j)}, C+=Ri^{Nφ(j)}
08        ELSE DO C+=Vi^{Nφ(j)}
09      NEXT i
10    NEXT j
11    V=C/K, N=N/2, L=L*2*2
12  END DO
```

(a) K=1

(b) K=2

(c) K=3

(d) K=4

NOISE ELIMINATING DEVICE AND METHOD THEREFOR

BACKGROUND OF THE INVENTION

1. Field of the Invention

The present invention relates to a noise eliminating device for reducing a noise contained in an image signal such as a video signal, and to a program for the noise eliminating device.

2. Description of the Related Art

There exist many devices and methods for eliminating a noise from an image signal. For example, a technique is known in which a difference between a signal obtained from a certain pixel and a signal obtained from a pixel orthogonally adjacent to the certain pixel is obtained, and a value obtained by multiplying the difference by k is subtracted from the signal obtained from the certain pixel (see JP 07-184225 A, page 1, FIG. 1). According to this method, when a small difference is obtained, a probability that each of the two signals is a noise component is high, and hence a value of k is increased, while a large difference is obtained, a probability that each of the two signals is an image component is high, and hence a value of k is decreased.

In addition, a technique is known in which a plurality of noise eliminating filters, and means for detecting a horizontal edge and a vertical edge of an image signal are provided, and horizontal smoothing and vertical smoothing are carried out based on the detected horizontal edge and the detected vertical edge, respectively, thereby reducing a noise contained in an image signal (see JP 09-200579 A, page 1, FIG. 1).

However, the conventional technique involves the following problem. The conventional noise eliminating method depends on a local property of an image. Thus, the noise is reduced by filters having different characteristics. However, since the accuracy of detecting the local property is poor, the noise component is imperfectly separated from the image component due to failure in judgment or mismatching between the judgment result and the characteristics of the filters in some cases. As a result, there is encountered a problem in that the noise elimination causes new disturbance, and so forth.

SUMMARY OF THE INVENTION

The present invention has been made in order to solve the problem as described above, and it is, therefore, an object of the present invention to obtain a noise eliminating device capable of efficiently separating a noise component from an image component to attenuate only the noise component.

According to the present invention, there is provided a noise eliminating device for eliminating a noise contained in an input image signal to generate an output image signal, including: an input image buffer for storing the input image signal; an output image buffer for storing the output image signal; an intermediate image buffer for storing an intermediate image signal for which a noise eliminating processing is being executed; a first input reading means for reading out an image signal of a predetermined block specified by a predetermined position and a predetermined size as input image block data from the input image buffer; a second input reading means for reading out image signals containing the image signals of the predetermined block and vicinities of the predetermined block as reference data from the input image buffer; output reading means for reading out an image signal of the predetermined block as output image block data from the output image buffer for storing the output image signal; comparing means for comparing a difference signal representing a difference between the input image data block and the output image block data with a predetermined value; retrieving means for retrieving block data correlating with the input image block data as retrieval block data from the reference data; switching means for receiving as its inputs the output image block data and the retrieval block data to select the output image block data as output image block update data when a level of the difference signal is equal to or smaller than the predetermined value based on comparison results obtained by the comparing means and to select the retrieval block data as output image block update data when the level of the difference signal is larger than the predetermined value based on the comparison results obtained by the comparing means; intermediate writing means for writing, to the intermediate image buffer, the output image block update data selected by the switching means as the intermediate image signal for which the noise eliminating processing is being executed; multiplying means for scaling the output image block update data accumulated in the intermediate image buffer; output writing means for writing the output image block update data scaled by the multiplying means to the output image buffer; and control means for carrying out overall control to successively set a plurality of predetermined blocks each having a predetermined size for a plurality of predetermined positions, and to update output image data accumulated in the output image buffer with a plurality of output image block update data respectively corresponding to the plurality of predetermined blocks.

According to the present invention, there is provided a program for a noise eliminating device that eliminates a noise contained in an input image signal to generate an output image signal, in which the program causes a computer to execute: a first input reading means for reading out an image signal of a predetermined block specified by a predetermined position and a predetermined size as input image block data from an input image buffer for storing the input image signal; a second input reading means for reading out image signals containing the image signals of the predetermined block and vicinities of the predetermined block as reference data from the input image buffer; output reading means for reading out an image signal of the predetermined block as output image block data from an output image buffer for storing the output image signal; comparing means for comparing a difference signal representing a difference between the input image data block and the output image block data with a predetermined value; retrieving means for retrieving block data correlating with the input image block data as retrieval block data from the reference data; switching means for receiving as its inputs the output image block data and the retrieval block data to select the output image block data as output image block update data when a level of the difference signal is equal to or smaller than the predetermined value based on comparison results obtained by the comparing means and to select the retrieval block data as output image block update data when the level of the difference signal is larger than the predetermined value based on the comparison results obtained by the comparing means; intermediate writing means for writing, to the intermediate image buffer, the output image block update data selected by the switching means as an intermediate image signal for which a noise eliminating processing is being executed; multiplying means for scaling the output image block update data accumulated in the intermediate image buffer; output writing means for writing the output image block update data scaled by the multiplying means to the output image buffer; and control means for carrying out overall control to successively set a plurality of predetermined blocks each having a predetermined size for a plurality of predetermined positions, and to update output image data accumulated in the output image buffer with a plurality of output image block update data respectively corresponding to the plurality of predetermined blocks.

According to the present invention, it is possible to obtain the noise eliminating device capable of detecting local correlations of an image from multiple directions to eliminate a noise component by utilizing the direction having the highest correlation to efficiently separate the noise component from the image component, thereby attenuating only the noise component, and the program for the noise eliminating device.

DETAILED DESCRIPTION OF THE PREFERRED EMBODIMENTS

Hereinafter, preferred embodiments of a noise eliminating device and a program for the noise eliminating device of the present invention will be described with reference to the accompanying drawings. A feature of the noise eliminating device and the program for the noise eliminating device of the present invention is that a processing for replacing only data in which distortion (a difference between an input image signal and an output image signal) is large with adjacent data is repeatedly executed while a block size is gradually reduced, thereby eliminating a noise without involving large distortion.

Embodiment 1

Figure 1:
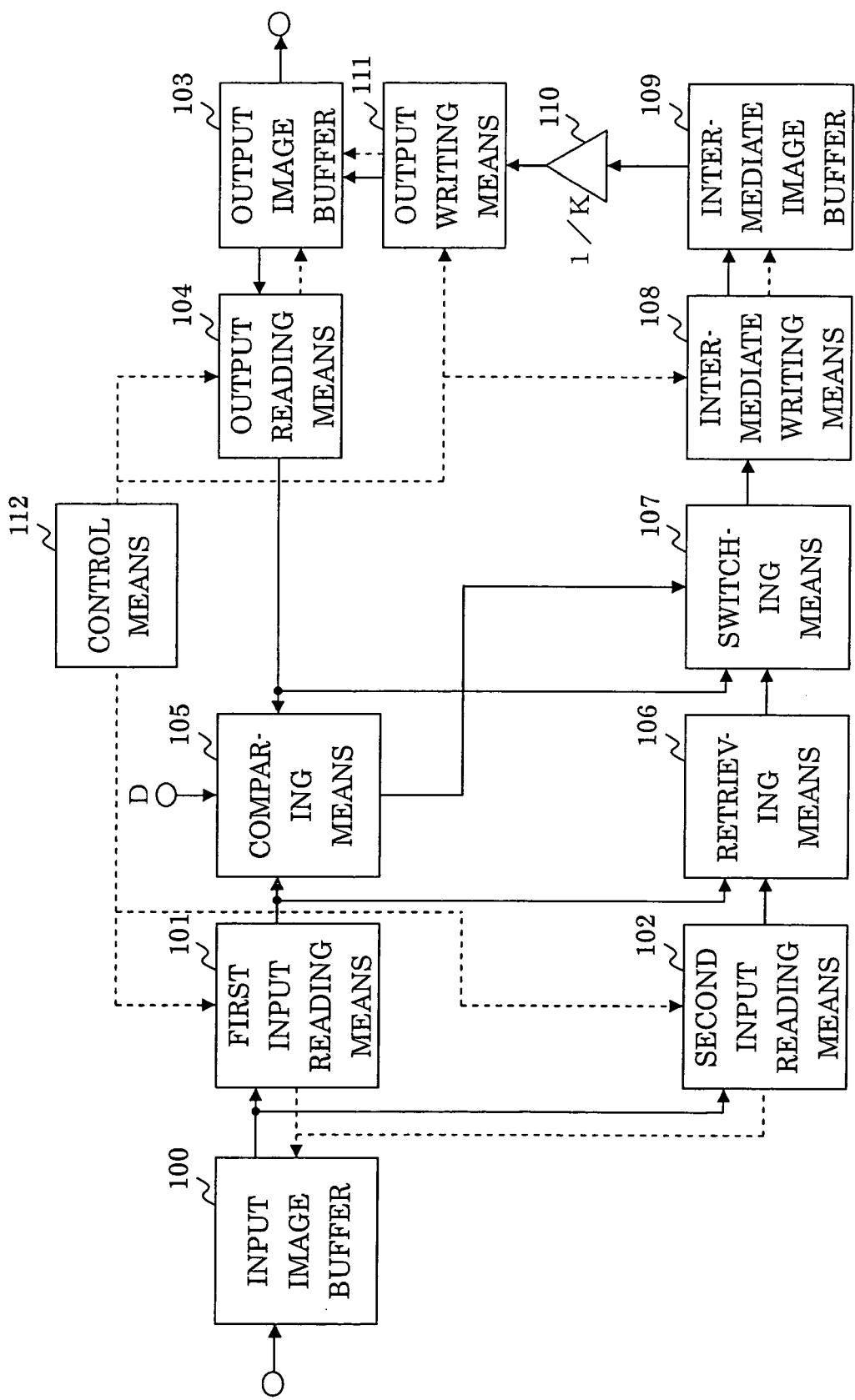
FIG. 1 is a block diagram showing a configuration of a noise eliminating device according to Embodiment 1 of the present invention.

FIG. 1 is a block diagram showing a configuration of a noise eliminating device according to Embodiment 1 of the present invention. In FIG. 1, an input image buffer 100 is a buffer for accumulating input image signals. A first input reading means 101 is connected to the input image buffer 100 in order to read out an image signal of a predetermined block specified by a predetermined position and a predetermined size as input image block data.

A second input reading means 102 is connected to the input image buffer 100 in order to read out input image data of the predetermined block the image signal of which is read out by the first input reading means 101 and input image data in the vicinities of the predetermined block as reference data.

An output image buffer 103 is a buffer for preserving an output image signal. An output reading means 104 is connected to the output image buffer 103 in order to read out an image signal of the predetermined block the image signal of which is read out by the first input reading means 101 as output image block data. A comparing means 105 receives as its inputs the input image block data of the predetermined block read out by the first reading means 101 and the output image block data of the above predetermined block read out by the output reading means 104 to compare a difference between the input image block data and the output image block data with a predetermined value D.

A retrieving means 106 retrieves data most approximating the input image block data read out by the first input reading means 101 (i.e., the data having the highest correlation) from the reference data read out by the second input reading means 102 as retrieval block data. A switching means 107 selects either the output image block data as an output of the output reading means 104 or the retrieval block data as an output of the retrieving means 106 based on comparison results obtained by the comparing means 105 and outputs the selected data as output image block update data.

An intermediate writing means 108 is means for writing the output image block update data selected by the switching means 107 as an intermediate image signal for which a noise eliminating processing is being executed. An intermediate image buffer 109 is a buffer for accumulating the output image block update data written by the intermediate writing means 108.

A multiplying means 110 is means for carrying out scaling by multiplying the output image block update data accumulated in the intermediate image buffer 109 by a predetermined value. An output writing means 111 writes the output image block update data scaled by the multiplying means 110 to the output image buffer 103, thereby updating the output image.

Moreover, a control means 112 is connected to the reading means such as the first input reading means 101, the second input reading means 102, and the output reading means 104, and the writing means such as the intermediate writing means 108 and the output writing means 111 in order to make overall control on determination of a predetermined position and a predetermined size which are used to regulate a predetermined block, or a timing for an arithmetic operation processing.

Figures 2, 3:
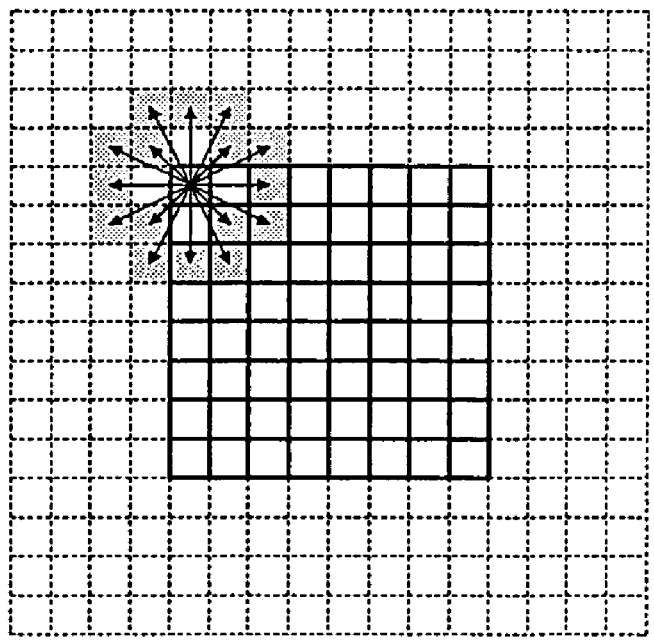
FIG. 2 shows a code describing an operation of the noise eliminating device according to Embodiment 1 of the present invention.
FIG. 3 is a conceptual diagram showing a retrieval range retrieved by retrieving means of the noise eliminating device according to Embodiment 1 of the present invention.

Next, an operation of the noise eliminating device shown in FIG. 1 will be described with reference to a pseudo code corresponding to a program for carrying out noise elimination. FIG. 2 shows a code describing the operation of the noise eliminating device according to Embodiment 1 of the present invention. In FIG. 2, reference symbol V corresponds to the output image data accumulated in the output image buffer 103, and reference symbol C corresponds to the intermediate image data accumulated in the intermediate image buffer 109. In addition, reference symbol N designates a size of a block, reference symbol K designates the number of overlapped blocks (i.e., corresponds to the number of phases which will be described later), and reference symbol L designates the number of blocks.

In addition, a suffix j represents a kind of certain phase of phases 1 to K, and a suffix i represents a predetermined block of blocks 1 to L. Also, reference symbol $Vi^{N\Phi(j)}$ designates output image block data corresponding to a phase j and a block i and has elements for N×N pixels. Reference symbol $Bi^{N\Phi(j)}$ designates input image block data corresponding to the phase j and the block i and has the elements for N×N pixels. Moreover, reference symbol $Ri^{N\Phi(j)}$ designates retrieval block data corresponding to the phase j and the block i and has the elements of N×N pixels.

Firstly, the input image buffer 100 stores an input image signal, and a value V of the output image buffer 103 is initialized to zero (first line in FIG. 2). Next, the first input reading means 101 and the output reading means 104 successively read out the image block data corresponding to the phase j and the predetermined block i from the input image buffer 100 and the output image buffer 103, respectively. A size of this block is assumed to be N (pixels)×N (pixels). However, the shape of the block is not limited to a square.

Here, an initial value of N is assumed to be Nmax (first line in FIG. 2). In a case where the input image is of a VGA size (640×480 pixels) or so, a typical value of Nmax is in a range of 32 to 64. After N is initialized, a value C of the intermediate image buffer 109 is initialized to zero (third line in FIG. 2).

Next, the input image block data $Bi^{N\oplus(j)}$, as the output of the first input reading means 101, corresponding to the phase j and the block i, and the output image block data $Vi^{N\oplus(j)}$, as the output of the output reading means 104, corresponding to the phase j and the block i are inputted to the comparing means 105. The comparing means 105 compares a level of a signal representing a difference between the input image block data $Bi^{N\oplus(j)}$ and the output image block data $Vi^{N\oplus(j)}$ with a predetermined value D (sixth line in FIG. 2).

Here, the level of the difference signal, for example, can be calculated as a value which is obtained by dividing a total sum of absolute values of the difference signals for the pixels corresponding to the two image block data, i.e., $Bi^{N\oplus(j)}$ and $Vi^{N\oplus(j)}$, or a total sum of electric powers each obtained as a square of the difference signal by the number of pixels, N×N.

When the level of the difference signal is represented by d, if the comparison results show a relationship of d>D, the comparing means 105 sets the input signal to the switching means 107 to the retrieval block data $Ri^{N\oplus(j)}$ as the output of the retrieving means 106. On the other hand, if the comparison results show a relationship of d≦D, the comparing means 105 sets the input signal to the switching means 107 to the output image block data $Vi^{N\oplus(j)}$ as the output of the output reading means 104.

Thus, when the level d of the difference signal is smaller than the predetermined value D, the switching means 107 outputs the output image block data $Vi^{N\oplus(j)}$ as the output of the output reading means 104 as it is. On the other hand, when the level d of the difference signal is equal to or larger than the predetermined value D, the switching means 107 outputs the retrieval block data $Ri^{N\oplus(j)}$ as the output of the retrieving means 106 instead of the output block data $Vi^{N\oplus(j)}$ and transfers the retrieval block data $Ri^{N\oplus(j)}$ to the intermediate writing means 108 (seventh and eighth lines in FIG. 2).

Here, a description will be given with respect to the retrieval block data $Ri^{N\oplus(j)}$ as the output from the retrieving means 106. The first input reading means 101 reads out the input image block data $Bi^{N\oplus(j)}$ corresponding to the phase j and the block i from the input image buffer 100. Also, the second input reading means 102 reads out the input image block data $Bi^{N\oplus(j)}$ and its peripheral data from the input image buffer 100.

The data which has been read out by the second input reading means 102 is supplied as the reference data to the retrieving means 106. The retrieval means 106 retrieves the data most approximating the input image data block $Bi^{N\oplus(j)}$ supplied from the first input reading means 101 (i.e. the data having the highest correlation) from the reference data supplied from the second input reading means 102, and outputs the retrieval results as the retrieval block data $Ri^{N\oplus(j)}$ to the switching means 107.

Here, similarly to the case of the above-mentioned comparing means 105, the retrieving means 106 can use a value which is obtained by dividing a total sum of absolute values of the difference signals or a total sum of electric powers each obtained as a square of the difference signal by the number of pixels, N×N, as a measure of the correlation. The retrieving means 106 extracts data with the smallest value as the retrieval block data $Ri^{N\oplus(j)}$.

In addition, the retrieval processing by the retrieving means 106 is executed except for the data in the position corresponding to that of the input image block data read out by the first input reading means 101, and for the data in the vicinities of the position. Unless this measure is carried out, the retrieving means 106 usually outputs its own block data (the input image block data itself read out by the first input reading means 101) as the retrieval block data $Ri^{N\oplus(j)}$. As a result, the noise eliminating device shown in FIG. 1 cannot perform the function of eliminating a noise.

FIG. 3 is a conceptual diagram showing a retrieval range retrieved by the retrieving means 106 of the noise eliminating device according to Embodiment 1 of the present invention. There is shown the retrieval range when the retrieval processing is executed except for an area within a distance (radius) equal to or shorter than a size of one pixel from a predetermined block as a center. Also, in FIG. 3, when a size of one predetermined block is assumed to be 8×8 pixels, directions and distances for the retrieval for a pixel located in upper left of the block of 8×8 pixels are indicated by arrows.

This process is also applied to each of other pixels within the block. Thus, the retrieval is carried out in blocks for all the pixels using the same vectors. That is, in an example shown in FIG. 3, a value obtained by dividing a total sum of absolute values of the difference signals, or a total sum of electric powers each obtained as a square of the difference signal by the number of pixels, N×N, is obtained for 8×8 pixels, i.e., 64 pixels in total for 16 patterns indicated by respective arrows. Then, the smallest value among those values is selected as the data most correlating with the input image block data to obtain the retrieval block data $Ri^{N\oplus(j)}$.

As previously described, the switching means 107 switches between the output image block data $Vi^{N\oplus(j)}$ as the output of the output reading means 104 and the retrieval block data $Ri^{N\oplus(j)}$ as the output of the retrieving means 106 based on the comparison results obtained by the comparing means 105 and transfers the output image block data $Vi^{N\oplus(j)}$ or the retrieval block data $Ri^{N\oplus(j)}$ as the output image block update data to the intermediate writing means 108.

The intermediate writing means 108 writes, to the intermediate image buffer 109, the output image block update data transferred thereto from the switching means 107 as an intermediate image signal for which the noise eliminating processing is being executed. Here, the intermediate image buffer 109 performs a function as an accumulator, and is constructed so as to hold the results which are obtained by adding a new intermediate image signal to the previously accumulated intermediate image signal.

Moreover, the control means 112 operates so as to control the reading means such as the first input reading means 101, the second input reading means 102, and the output reading means 104, and the writing means such as the intermediate writing means 108, and the output writing means 111 to specify a predetermined position and a predetermined size which are used to regulate a predetermined block in the overall image. The predetermined block is specified so that a phase is changed in K kinds with respect to one block size N.

Figure 4:
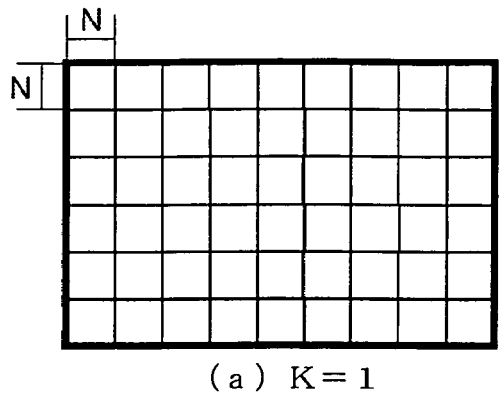
FIGS. 4A to 4D are respectively diagrams showing block positions when a phase in Embodiment 1 of the present invention is changed.
Figure 4:
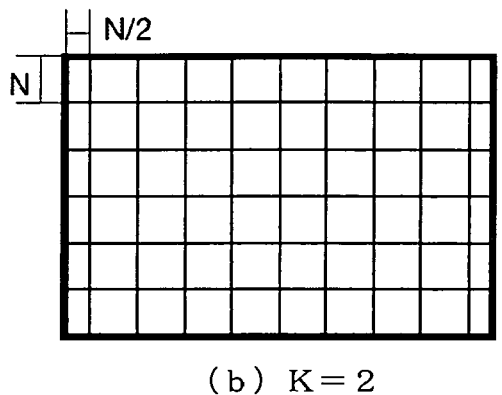
Figure 4:
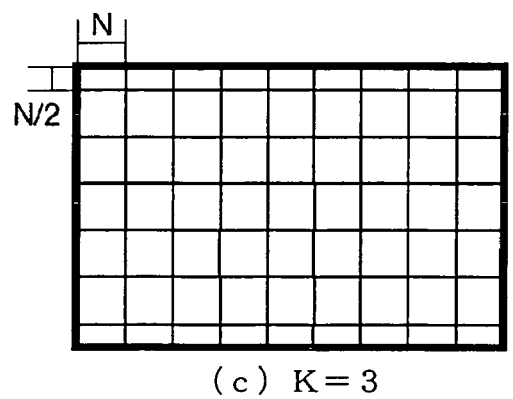
Figure 4:
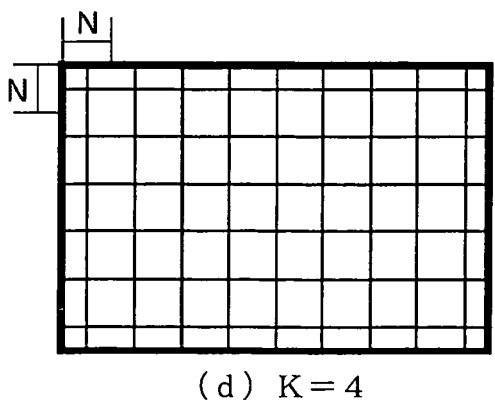

FIGS. 4A to 4D show block positions in a case where the phase is changed in Embodiment 1 of the present invention. Thus, there are shown the block positions in the case where the phase is changed in 4 kinds when K=4. To take a case where one block is set as 8×8 pixels (i.e., N=8) as an example, FIG. 4A shows a state in which no phase is shifted and thus the blocks are held as they are, which corresponds to the phase K=1.

FIG. 4B shows a state in which the pixels are shifted in a right-hand direction by four pixels and which corresponds to the phase K=2; FIG. 4C shows a state in which the pixels are shifted in a downward direction by four pixels and which corresponds to the phase K=3; and FIG. 4D shows a state in which the pixels are shifted in the right-hand direction by four pixels and in the downward direction by four pixels, and which corresponds to the phase K=4.

Here; each of the peripheral blocks of an image does not necessarily have a size of N×N pixels. However, with respect to each of those portions, the retrieval has only to be carried out for each portion including data. Then, the comparing means 105, the retrieving means 106, the switching means 107, and the intermediate writing means 108 operate in the manner described above for the four kinds of phases in accordance with the operation of the control means 112.

The phase is shifted in such a manner, whereby a plurality of predetermined blocks come to overlap one another. As a result, the intermediate image buffer 109 accumulates the updated data for four times (K=4) per pixel. At a time when the accumulation is completed for all the pixels, the multiplying means 110 multiplies the output of the intermediate image buffer 109 by 1/K, thereby carrying out the scaling. As a result, the updated data of each pixel is obtained as an average value for a plurality of phases.

The output after completion of the scaling is written to the output image buffer 103 through the output writing means 111 (eleventh line in FIG. 2). The local correlations of the image are detected from multiple directions in such a manner, and the noise is eliminated by utilizing the direction having the highest correlation. Results of the noise elimination are written to the output image buffer 103.

When the contents of the intermediate image buffer 109 are transferred to the output image buffer 103, the same processing is repeatedly executed by using the contents of the output image buffer 103 after completion of this update and the contents of the input image buffer 100 next time. At this time, the block size is reduced from N×N to N/2×N/2 in accordance with the operation of the control means 112, and the number of blocks, L, is increased to L×2×2 accordingly (eleventh line in FIG. 2). This is repeated until N becomes Nmin (second line in FIG. 2). A typical value of Nmin is 1.

When a difference between the output image block data read out from the output image buffer 103 and the input image block data read out from the input image buffer 100 is sufficiently small (i.e., when the difference is equal to or smaller than the predetermined value D), the contents of the output image block data read out from the output image buffer 103 are outputted from the switching means 107 as they are, and no contents of the output image buffer 103 are updated.

On the other hand, when the difference between the output image block data read out from the output image buffer 103 and the input image block data read out from the input image buffer 100 is larger than the predetermined value D, the contents of the output image buffer 103 are updated with the retrieval block data which is retrieved as the block data having the high correlation by the retrieving means 106.

As described above, the noise eliminating device shown in FIG. 1 operates to repeatedly execute the processing for replacing only a portion in which distortion (the difference between the input image signal and the output image signal) is large with adjacent data while the block size is gradually reduced, thereby eliminating the noise without involving large distortion.

Here, the mechanism for eliminating the noise by utilizing this method is such that the image data for which the replacement is carried out with a different phase is accumulated in the intermediate image buffer 109, and the average value of the image data is calculated by the multiplying means 110.

Considering the fact that the retrieving means 106 outputs the block correlating highly with the predetermined block, it is understood that the image signal having the high correlation is preserved, and the noise signal having the low correlation is attenuated through the averaging process. Thus, it can be judged that the noise eliminating device shown in FIG. 1 attenuates only the noise component by utilizing the difference in local correlations between the image signal and the noise signal.

As described above, according to Embodiment 1 of the present invention, the local correlations of the image are detected from the multiple directions, and the noise is eliminated by utilizing the direction having the highest correlation. Hence, there is an effect in which the noise is efficiently separated from the image signal as compared with the prior art, and only the noise component is attenuated.

Note that in Embodiment 1 described above, the two-dimensional still image data is used as the input signal. However, the present invention can also be applied to a multidimensional signal of a moving image or the like by increasing the retrieval range for the block in a time direction.

In addition, in the above description of Embodiment 1, the noise eliminating device has the function of eliminating the general noise as the effect of Embodiment 1. However, the noise eliminating device of the present invention is not limited to Embodiment 1. Thus, the noise may also be a signal which carries information. That is, a technique such as digital watermarking or steganography is known in which a meaningful noise is added to a signal to conceal information. According to the present invention, there is offered an effect in which the signal thus embedded is attenuated and the remaining signal is spatially shifted, thereby disturbing detection of the information.

What is claimed is:

1. A noise eliminating device for eliminating a noise contained in an input image signal to generate an output image signal, comprising:

an input image buffer for storing the input image signal;

an output image buffer for storing the output image signal;

an intermediate image buffer for storing an intermediate image signal for which a noise eliminating processing is being executed;

a first input reading means for reading out an image signal of a predetermined block specified by a predetermined position and a predetermined size as input image block data from the input image buffer;

a second input reading means for reading out image signals containing the image signals of the predetermined block and vicinities of the predetermined block as reference data from the input image buffer;

output reading means for reading out an image signal of the predetermined block as output image block data from the output image buffer;

comparing means for comparing a difference signal representing a difference between the input image data block and the output image block data with a predetermined value;

retrieving means for retrieving block data correlating with the input image block data as retrieval block data from the reference data;

switching means for receiving as its inputs the output image block data and the retrieval block data to select the output image block data as output image block update data when a level of the difference signal is equal to or smaller than the predetermined value based on comparison results obtained by the comparing means and to select the retrieval block data as output image block update data when the level of the difference signal is larger than the predetermined value based on the comparison results obtained by the comparing means;

intermediate writing means for writing, to the intermediate image buffer, the output image block update data selected by the switching means as the intermediate image signal for which the noise eliminating processing is being executed;

multiplying means for scaling the output image block update data accumulated in the intermediate image buffer;

output writing means for writing the output image block update data scaled by the multiplying means to the output image buffer; and control means for carrying out overall control to successively set a plurality of predetermined blocks each having a predetermined size for a plurality of predetermined positions, and to update output image data accumulated in the output image buffer with a plurality of output image block update data respectively corresponding to the plurality of predetermined blocks.

2. A noise eliminating device according to claim 1, wherein the control means sets the plurality of predetermined positions so that the plurality of predetermined blocks overlap one another.

3. A noise eliminating device according to claim 1 or 2, wherein the control means carries out overall control so that the predetermined size used to regulate a size of a predetermined block when the output image data accumulated in the output image buffer is updated is set to gradually reduce, and the output image signal is repeatedly updated in correspondence to the size of the predetermined block.

4. A method for eliminating a noise contained in an input image signal to generate an output image signal, comprising the steps of:

reading out an image signal of a predetermined block specified by a predetermined position and a predetermined size as input image block data from an input image buffer for storing the input image signal;

reading out image signals containing the image signals of the predetermined block and vicinities of the predetermined block as reference data from the input image buffer;

reading out an image signal of the predetermined block as output image block data from an output image buffer for storing the output image signal;

comparing a difference signal representing a difference between the input image data block and the output image block data with a predetermined value;

retrieving block data correlating with the input image block data as retrieval block data from the reference data;

receiving as inputs the output image block data and the retrieval block data to select the output image block data as output image block update data when a level of the difference signal is equal to or smaller than the predetermined value based on comparison results obtained and to select the retrieval block data as output image block update data when the level of the difference signal is larger than the predetermined value based on the comparison results obtained;

writing, to an intermediate image buffer, the output image block update data selected as an intermediate image signal for which a noise eliminating processing is being executed;

scaling the output image block update data accumulated in the intermediate image buffer;

writing the output image block update data scaled to the output image buffer; and carrying out overall control to successively set a plurality of predetermined blocks each having a predetermined size for a plurality of predetermined positions, and to update output image data accumulated in the output image buffer with a plurality of output image block update data respectively corresponding to the plurality of predetermined blocks.

* * * * *